J. E. WARD.
HOSE COUPLING AND GASKET THEREFOR.
APPLICATION FILED DEC. 26, 1907.

938,731.

Patented Nov. 2, 1909.

Witnesses
Geo. Schwarz
S. Hubert

Inventor
John E. Ward
By his Attorneys,
Liddle Wendell & Harvey

UNITED STATES PATENT OFFICE.

JOHN E. WARD, OF NEW YORK, N. Y., ASSIGNOR TO WARD EQUIPMENT COMPANY, OF NEW YORK, N. Y., A CORPORATION OF NEW YORK.

HOSE-COUPLING AND GASKET THEREFOR.

938,731.  Specification of Letters Patent.  Patented Nov. 2, 1909.

Application filed December 26, 1907. Serial No. 408,157.

*To all whom it may concern:*

Be it known that I, JOHN E. WARD, a citizen of the United States, and a resident of the borough of Manhattan, of the city of New York, in the county and State of New York, have made certain new and useful Improvements in Hose-Couplings and Gaskets Therefor, of which the following is a specification, reference being had to the accompanying drawing, forming a part hereof.

One object of this invention is to provide a gasket for hose-couplings and the like which shall be readily attachable to and detachable from the heads of the couplings, which shall remain securely in position when seated in one of the coupling heads, and which shall be simple and comparatively inexpensive in its construction.

Another object of the invention is to provide for such purpose a gasket which shall not be easily breakable under ordinary conditions of use but which on the other hand shall have a durability beyond that of the average gasket of this sort, and one which, notwithstanding constant usage, shall tend to maintain its original shape so as to operate efficiently for a long period of time.

The invention will be more fully described hereinafter in connection with the accompanying drawing in which the improvements are illustrated.

Figure 1:
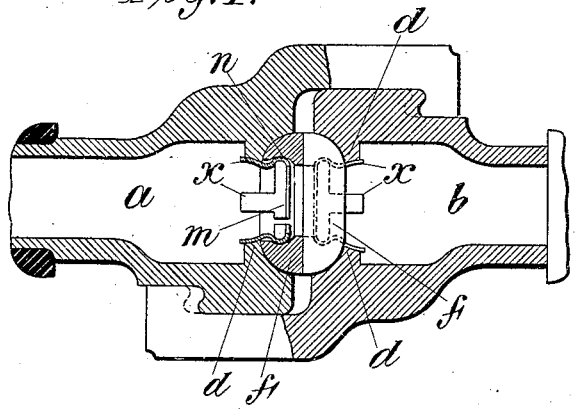
Figure 2:
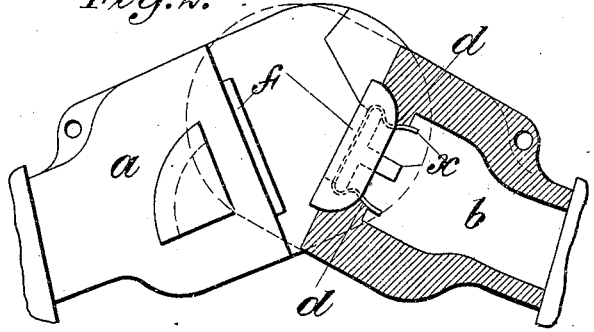
Figure 3:
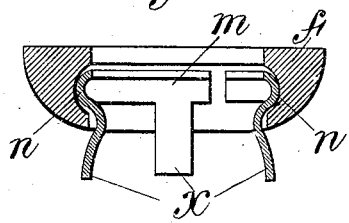

In said drawing, Figure 1 is a view partly in section and partly in elevation, of a hose-coupling provided with two of the improved gaskets, which are shown in operative relation with each other. Fig. 2 is a similar view, but with the heads of the hose-couplings slightly separated. Fig. 3 is a sectional view of one of the gaskets removed from the couplings, and, Fig. 4 is a similar view showing a modification.

The two heads of the couplings $a$ and $b$ respectively are provided as usual, at their adjoining ends, with seats for their respective gaskets. Underneath the seats, each coupling head is cut away to form a shoulder $d$ which is engaged by short resilient projections $x$ with which each gasket is provided to secure the gasket upon its seat. As many of these projections may be provided as is desired, four being generally sufficient, and it is preferable to form the projections on a separable ring $m$ which fits into a seat $n$ which is formed by an annular recess in the main portion of the gasket. The main portion of the gasket is denoted by the reference character $f$ and may be formed of hard rubber, or of metal, or of any other suitable substance.

As shown in Figs. 1, 2 and 3, the gasket is of the form commonly referred to as an "oscillating" gasket. In such a construction the gasket is rounded on one face to fit a correspondingly rounded socket in the couplings whereby it may twist or turn about therein to adjust itself squarely against the coöperating gasket. The ring $m$, in assembling the parts, is slipped into its seat $n$, being split for this purpose whereby it may be compressed sufficiently to pass it into the opening of the gasket. Moreover, the seat and the ring are so related to each other as to permit the gasket to have a certain play within its socket for the purpose of allowing it to oscillate freely.

Figure 4:
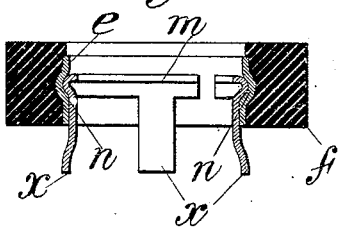

In Fig. 4, a gasket of the fixed type is shown in which the body portion $f$ is provided with a metallic frame portion $e$ in which the annular seat $n$ is formed. In the case of this construction, the ring fits the recess or seat closely, as the gasket is not required to have any play.

It will be obvious that the improvements provide gaskets which are simple to manufacture and assemble, and as the gasket proper is separable from the fastening part, either may be discarded or replaced when necessary without affecting the other parts.

I claim as my invention:

1. A gasket for hose-couplings and the like, comprising a body portion having one end rounded, a plurality of fastening projections and means to which said projections are secured, said means engaging the body portion so that it may have a free play with respect thereto.

2. A gasket for hose-couplings and the like, comprising a body portion having one end rounded, a split ring engaging the same with a free play, and fastening projections secured to the ring.

3. A gasket for hose-couplings and the like, comprising a body portion having an annular seat, a split ring adapted to fit loosely in said seat, and fastening projections secured to said ring.

This specification signed and witnessed this 7th day of December, A. D., 1907.

JOHN E. WARD.

Signed in the presence of—
WILLIAM S. DENISON,
HENRY J. HORN.